(12) United States Patent
Koh et al.

(10) Patent No.: US 12,524,258 B2
(45) Date of Patent: Jan. 13, 2026

(54) METHOD AND APPARATUS FOR MIGRATING VIRTUAL MACHINE IN MEMORY-DISAGGREGATED ENVIRONMENT

(71) Applicants: ELECTRONICS AND TELECOMMUNICATIONS RESEARCH INSTITUTE, Daejeon (KR); SYSGEAR CO., LTD., Seoul (KR)

(72) Inventors: Kwang-Won Koh, Daejeon (KR); Kang-Ho Kim, Daejeon (KR); Chang-Dae Kim, Daejeon (KR); Tae-Hoon Kim, Daejeon (KR); Sang-Ho Eom, Seoul (KR)

(73) Assignees: ELECTRONICS AND TELECOMMUNICATIONS RESEARCH INSTITUTE, Daejeon (KR); SYSGEAR CO., LTD., Seoul (KR)

( * ) Notice: Subject to any disclaimer, the term of this patent is extended or adjusted under 35 U.S.C. 154(b) by 566 days.

(21) Appl. No.: 18/076,163

(22) Filed: Dec. 6, 2022

(65) Prior Publication Data
US 2023/0176893 A1 Jun. 8, 2023

(30) Foreign Application Priority Data

Dec. 6, 2021 (KR) .................. 10-2021-0173215
Nov. 21, 2022 (KR) .................. 10-2022-0156424

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC .................. G06F 9/45558; G06F 2009/4557
See application file for complete search history.

(56) References Cited

U.S. PATENT DOCUMENTS 9,858,114 B2 1/2018 Fries et al.
9,998,558 B2 6/2018 Sammatshetti
(Continued)

FOREIGN PATENT DOCUMENTS

KR 10-1072807 10/2011
KR 10-1586598 1/2016
(Continued)

*Primary Examiner* — Jacob D Dascomb
(74) *Attorney, Agent, or Firm* — KILE PARK REED & HOUTTEMAN PLLC

(57) ABSTRACT

Disclosed herein are a method and apparatus for migrating a virtual machine in a memory-disaggregated environment. The method for migrating a virtual machine in a memory-disaggregated environment includes determining whether to migrate a virtual machine based on a number of accesses to a remote memory, establishing a migration policy for the virtual machine based on a remote memory access pattern, and determining a migration destination node based on the migration policy, wherein the migration policy includes a first migration policy corresponding to a case where the remote memory access pattern is sequential, and a second migration policy corresponding to a case where the remote memory access pattern is non-sequential.

18 Claims, 7 Drawing Sheets

(56) References Cited

U.S. PATENT DOCUMENTS

| | | | |
|---|---|---|---|
| 10,318,325 B2* | 6/2019 | Chambliss | H04L 67/148 |
| 10,318,344 B2* | 6/2019 | Gutierrez | G06F 12/0813 |
| 10,789,090 B2 | 9/2020 | Koh et al. | |
| 10,965,679 B2 | 3/2021 | Hwang et al. | |
| 11,586,549 B2* | 2/2023 | Koh | G06F 3/067 |
| 2014/0298338 A1 | 10/2014 | Doi | |
| 2018/0349164 A1* | 12/2018 | Asayag | G06F 9/45558 |
| 2019/0114079 A1 | 4/2019 | Kim et al. | |
| 2020/0341797 A1* | 10/2020 | Tsirkin | G06F 3/0647 |

FOREIGN PATENT DOCUMENTS

| | | |
|---|---|---|
| KR | 10-1613513 | 4/2016 |
| KR | 10-2017-0007103 | 1/2017 |
| KR | 10-2018-0085058 | 7/2018 |
| KR | 10-2019-0042465 | 4/2019 |

* cited by examiner

METHOD AND APPARATUS FOR MIGRATING VIRTUAL MACHINE IN MEMORY-DISAGGREGATED ENVIRONMENT

CROSS REFERENCE TO RELATED APPLICATIONS

This application claims the benefit of Korean Patent Application Nos. 10-2021-0173215, filed Dec. 6, 2021 and 10-2022-0156424, filed Nov. 21, 2022, which are hereby incorporated by reference in their entireties into this application.

BACKGROUND OF THE INVENTION

1. Technical Field

The present disclosure relates generally to a method for dynamically migrating a virtual machine in a memory-disaggregated environment.

More particularly, the present disclosure relates to technology for dynamically migrating a virtual machine by analyzing a remote memory access pattern and considering memory requirement and network status.

2. Description of the Related Art

In a memory disaggregation system, data requiring fast memory access is located in local Dynamic Random Access Memory (DRAM) present in a host on which a virtual machine is operating, and the remaining data is located in remote memory or the like, and thus high memory access performance may be obtained, and memory having larger capacity than that of DRAM controlled by a computer memory sub-system may be provided.

However, when the amount of memory to be accessed fast is greater than that of local DRAM, a virtual machine that is operating continues to access remote memory, thus increasing the deterioration of performance. In this case, when the memory of the host on which a program is running is insufficient, migration of the virtual machine to another node other than a currently operating node, among nodes that are managed, may be performed.

Unlike a conventional virtual machine in which all operating memories are located in one operating node (computing node), the virtual machine running in a memory disaggregation system is configured such that some of memories used by the virtual machine on the operating node are located in the operating node, and data in the remaining area is located on a remote node. In this case, the bandwidth or the like of an interconnect taking charge of connection between multiple nodes is used, and thus a virtual machine migration method in which a memory access pattern, network use, or the like is taken into consideration is required.

PRIOR ART DOCUMENTS

Patent Documents (Patent Document 1) Korean Patent Application Publication No. 10-2017-0007103 (Title: Method for Implementing RDMA NVMe Device)

SUMMARY OF THE INVENTION

Accordingly, the present disclosure has been made keeping in mind the above problems occurring in the prior art, and an object of the present disclosure is to provide an efficient method for dynamically migrating a virtual machine in a memory-disaggregated environment.

Another object of the present disclosure is to provide a method for efficiently performing migration of a virtual machine while maintaining the operation of the virtual machine.

In accordance with an aspect of the present disclosure to accomplish the above objects, there is provided a method for migrating a virtual machine in a memory-disaggregated environment, the method migrating a virtual machine running on a node in the memory-disaggregated environment, the method including determining whether to migrate a virtual machine based on a number of accesses to a remote memory, establishing a migration policy for the virtual machine based on a remote memory access pattern, and determining a migration destination node based on the migration policy, wherein the migration policy includes a first migration policy corresponding to a case where the remote memory access pattern is sequential, and a second migration policy corresponding to a case where the remote memory access pattern is non-sequential.

Establishing the migration policy may include determining whether the remote memory access pattern is sequential using a guest physical address.

The first migration policy may be configured to, when interconnect traffic occurring through remote memory access is less than or equal to a threshold value, perform aggressive prefetching from the remote memory.

The first migration policy may be configured to, when the interconnect traffic of the virtual machine is greater than the threshold value, determine whether to migrate the virtual machine by comparing the interconnect traffic of the virtual machine with interconnect traffic of an additional virtual machine.

The first migration policy may be configured to request reorganization of disaggregated memory blocks used by the virtual machine such that the disaggregated memory blocks are optimized for sequential access, and to determine a memory node in which the disaggregated memory blocks are reorganized to be the migration destination node.

The second migration policy may be configured to determine whether to migrate the virtual machine and determine the migration destination node, based on memory requirement of the virtual machine.

The second migration policy may be configured to determine a memory node having a minimum available memory, among memory nodes satisfying the memory requirement, to be the migration destination node.

The second migration policy may be configured to, when there is no memory node satisfying the memory requirement, determine a node having a maximum available memory, among memory nodes, to be the migration destination node.

The method may further include transmitting data from the remote memory used by the virtual machine to a direct memory of the migration destination node.

The method may further include transmitting data evicted from a node on which the virtual machine is running to the migration destination node.

In accordance with another aspect of the present disclosure to accomplish the above objects, there is provided an apparatus for migrating a virtual machine in a memory-disaggregated environment, the apparatus including a memory device configured to store data, and a virtual machine migration controller configured to determine whether to migrate a virtual machine based on a number of accesses to a remote memory, establish a migration policy for the virtual machine based on a remote memory access pattern, and determine a migration destination node based on the migration policy, wherein the migration policy includes a first migration policy corresponding to a case where the remote memory access pattern is sequential, and a second migration policy corresponding to a case where the remote memory access pattern is non-sequential.

The virtual machine migration controller may determine whether the remote memory access pattern is sequential using a guest physical address.

The first migration policy may be configured to, when interconnect traffic occurring through remote memory access is less than or equal to a threshold value, perform aggressive prefetching from the remote memory.

The first migration policy may be configured to, when the interconnect traffic of the virtual machine is greater than the threshold value, determine whether to migrate the virtual machine by comparing the interconnect traffic of the virtual machine with interconnect traffic of an additional virtual machine.

The first migration policy may be configured to request reorganization of disaggregated memory blocks used by the virtual machine such that the disaggregated memory blocks are optimized for sequential access, and to determine a memory node in which the disaggregated memory blocks are reorganized to be the migration destination node.

The second migration policy may be configured to determine whether to migrate the virtual machine and determine the migration destination node, based on memory requirement of the virtual machine.

The second migration policy may be configured to determine a memory node having a minimum available memory, among memory nodes satisfying the memory requirement, to be the migration destination node.

The second migration policy may be configured to, when there is no memory node satisfying the memory requirement, determine a node having a maximum available memory, among memory nodes, to be the migration destination node.

The virtual machine migration controller may perform control such that data from the remote memory used by the virtual machine is transmitted to a direct memory of the migration destination node.

The virtual machine migration controller may transmit data evicted from a node on which the virtual machine is running to the migration destination node.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
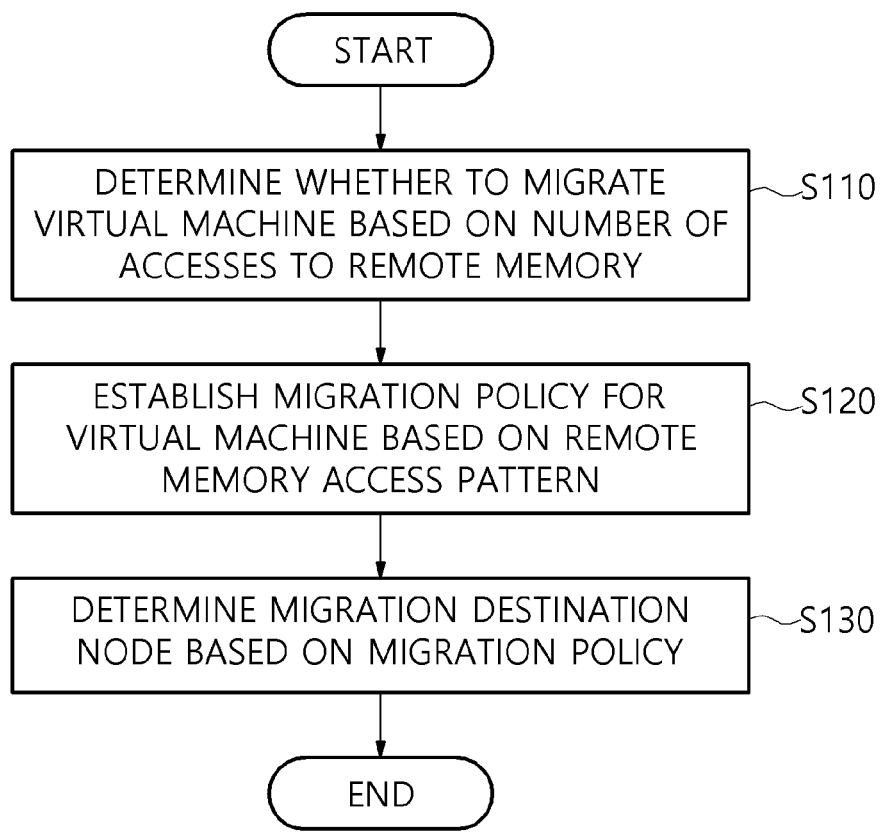
FIG. 1 is a flowchart illustrating a method for migrating a virtual machine in a memory-disaggregated environment according to an embodiment of the present disclosure.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, embodiments of the present disclosure will be described in detail with reference to the accompanying drawings. In the following description of the present disclosure, the same reference numerals are used to designate the same or similar elements throughout the drawings and repeated descriptions of the same components will be omitted.

An object of the present disclosure is to implement dynamic migration of a virtual machine in a memory disaggregation system. This is intended to, unlike conventional virtual machine migration technology in which all memories are located in a computing node, support virtual machine migration or the like required for performance management and maintenance of a memory disaggregation system in the light of the case where a migrated virtual machine makes random memory access and sequential memory access by migrating the virtual machine in consideration of the pattern of access to remote memory occurring as an application is running in the memory disaggregation system.

Further, because migration of a virtual machine is a task requiring a lot of time/network resources, an object of the present disclosure is to efficiently perform migration of a virtual machine in a memory-disaggregated environment while maximally maintaining the operation of the virtual machine.

Conventional virtual machine migration technology assumes that memory used by a virtual machine is located in a node on which the virtual machine is running. Unlike this technology, the present disclosure may manage the performance of a virtual machine using disaggregated memory in consideration of the amount of direct memory allocated to each disaggregated memory virtual machine, a remote memory access pattern, and network use by providing an effective method related to virtual machine migration technology in a completely different memory-disaggregated environment, and may effectively reduce infrastructure operation costs in a cloud infrastructure environment in which disaggregated memory is applied to multiple nodes by decreasing costs required for virtual machine migration.

Further, since migration of a virtual machine is a task requiring a lot of time and network resources, the present disclosure is intended to efficiently perform a virtual machine migration operation requiring a lot of time and network resources in a memory-disaggregated environment by suitably separating and performing virtual machine migration operations.

FIG. 1 is a flowchart illustrating a method for migrating a virtual machine in a memory-disaggregated environment according to an embodiment of the present disclosure.

Referring to FIG. 1, the method for migrating a virtual machine in a memory-disaggregated environment according to the embodiment of the present disclosure may include step S110 of determining whether to migrate a virtual machine based on the number of accesses to remote memory, step S120 of establishing a migration policy for the virtual machine based on a remote memory access pattern, and step S130 of determining a migration destination node based on the migration policy. Here, the migration policy may include a first migration policy corresponding to the case where the remote memory access pattern is sequential and a second migration policy corresponding to the case where the remote memory access pattern is non-sequential.

Here, at step S120 of establishing the migration policy, whether remote memory access is sequential may be determined using a guest physical address.

Here, the first migration policy is configured to perform aggressive prefetching from the remote memory when interconnect traffic occurring due to remote memory access is less than or equal to a threshold value.

Here, when the interconnect traffic of the virtual machine is greater than the threshold value, the first migration policy may be configured to determine whether to migrate the virtual machine by comparing the interconnect traffic of the virtual machine with the interconnect traffic of another virtual machine.

Here, the first migration policy may be configured to request reorganization so that disaggregated memory blocks used by the virtual machine are optimized for sequential access and to determine a memory node in which the blocks are reorganized to be a migration destination node.

Here, the second migration policy may be configured to determine whether to migrate the virtual machine and determine the migration destination node, based on the memory requirement of the virtual machine.

Here, the second migration policy may be configured to determine a memory node having the smallest (minimum) available memory, among memory nodes satisfying the memory requirement, to be the migration destination node.

Here, when there is no memory node satisfying the memory requirement, the second migration policy may be configured to determine a memory node having the largest (maximum) available memory, among the memory nodes, to be the migration destination node.

Although not illustrated in FIG. 1, the method for migrating a virtual machine in a memory-disaggregated environment according to the embodiment of the present disclosure may further include the step of transmitting data from remote memory used by the virtual machine to the direct memory of the migration destination node.

Here, although not illustrated in FIG. 1, the method for migrating a virtual machine in a memory-disaggregated environment according to the present disclosure may further include the step of transmitting data evicted from a node on which the virtual machine is running to the migration destination node.

Figure 2:
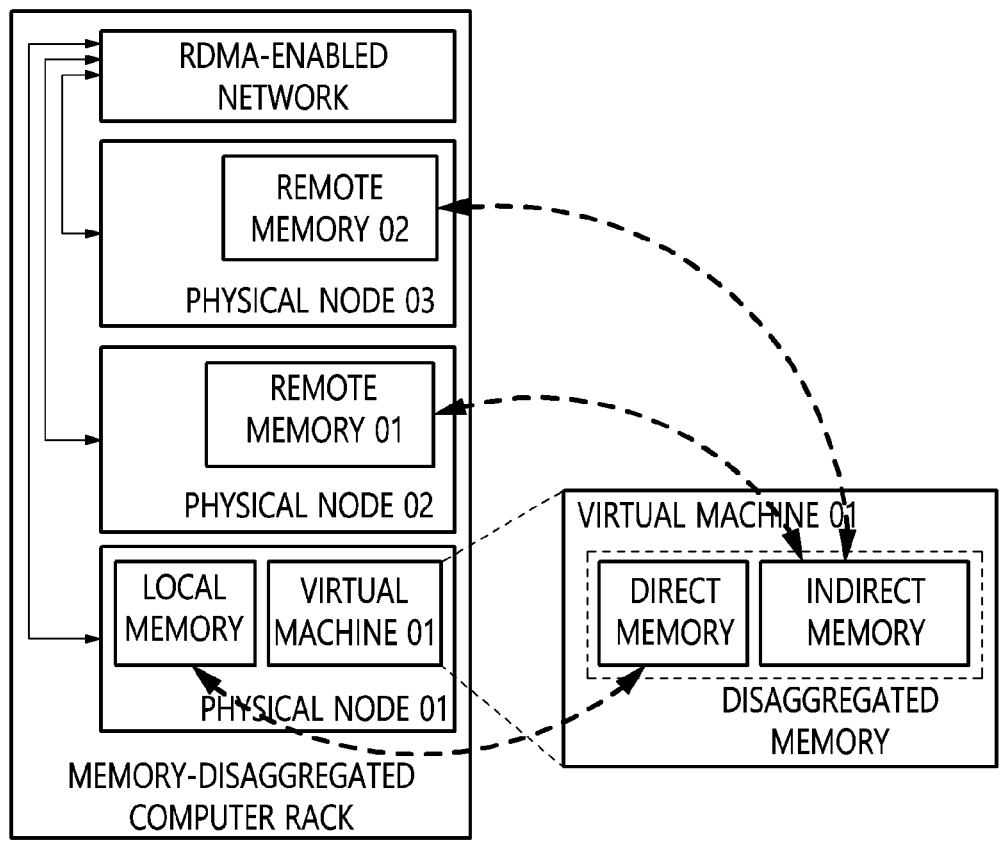
FIG. 2 illustrates an example of a memory resource allocation method used in a memory disaggregation system.

FIG. 2 illustrates an example of a memory resource allocation method used in a memory disaggregation system.

Referring to FIG. 2, virtual machine 01 is running on physical node 01 110, and uses, as direct memory, local memory 111 located in the physical node 01 110. Further, as indirect memory, remotely accessible memories 121 and 131 that are located in physical node 02 120 and physical node 03 130 are used. This means that data sensitive to performance is located in the local memory 111, and data less sensitive to performance is allocated to the remote memory, and thus a large-capacity memory use environment is provided while high performance is obtained.

In this way, a single virtual machine that is running by utilizing memory over several nodes may be created, and thus high flexibility and high resource utilization may be expected compared to existing virtual machine technologies which utilize only memory resources present in a single physical node.

Figure 3:
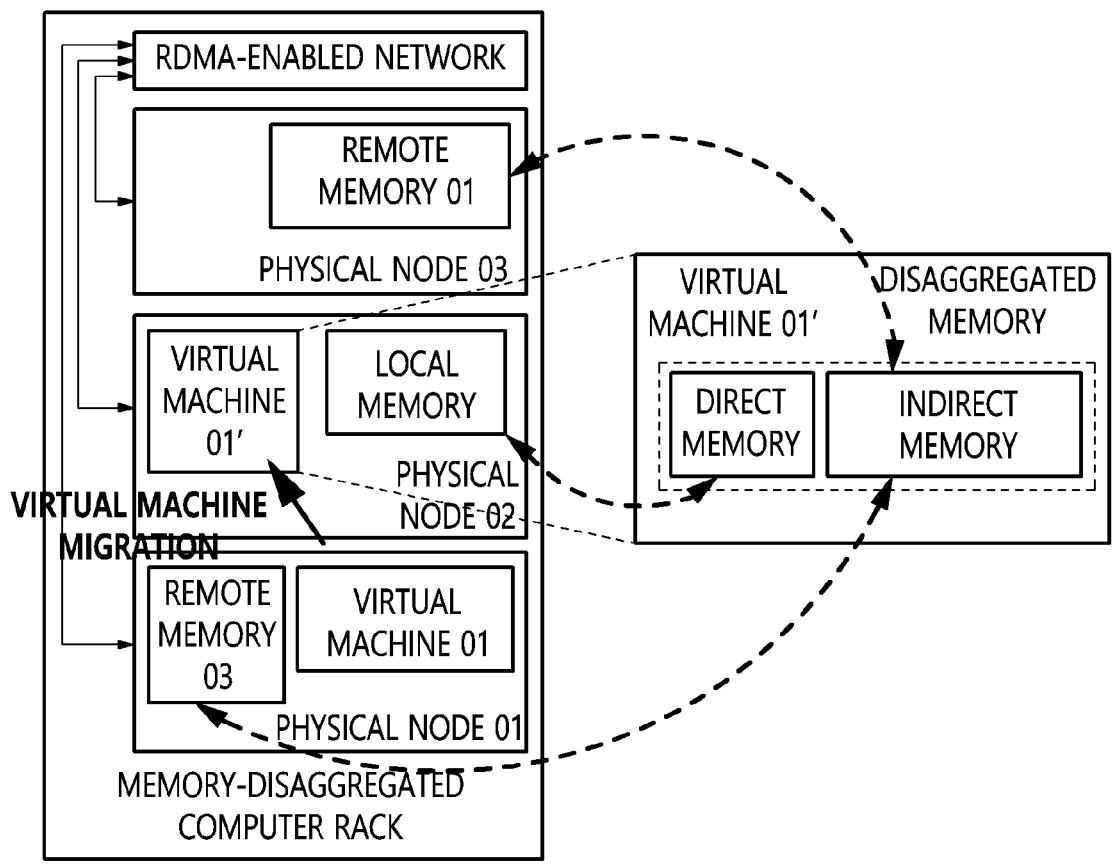
FIG. 3 is a diagram conceptually illustrating a change in memory allocation depending on migration of a virtual machine.

FIG. 3 is a diagram conceptually illustrating a change in memory allocation depending on migration of a virtual machine.

Referring to FIG. 3, virtual machine 01 illustrated in FIG. 2 is illustrated as migrating to physical node 02 in which more memories are usable as direct memory due to the limitation of available local memory in physical node 01 is illustrated. By performing this process, more local memories may be allocated compared to the case where the virtual machine is located in physical node 01, thus enabling more performance-sensitive data to be located in a local memory, with the result that the deterioration of performance attributable to disaggregated memory may be prevented.

Figure 4:
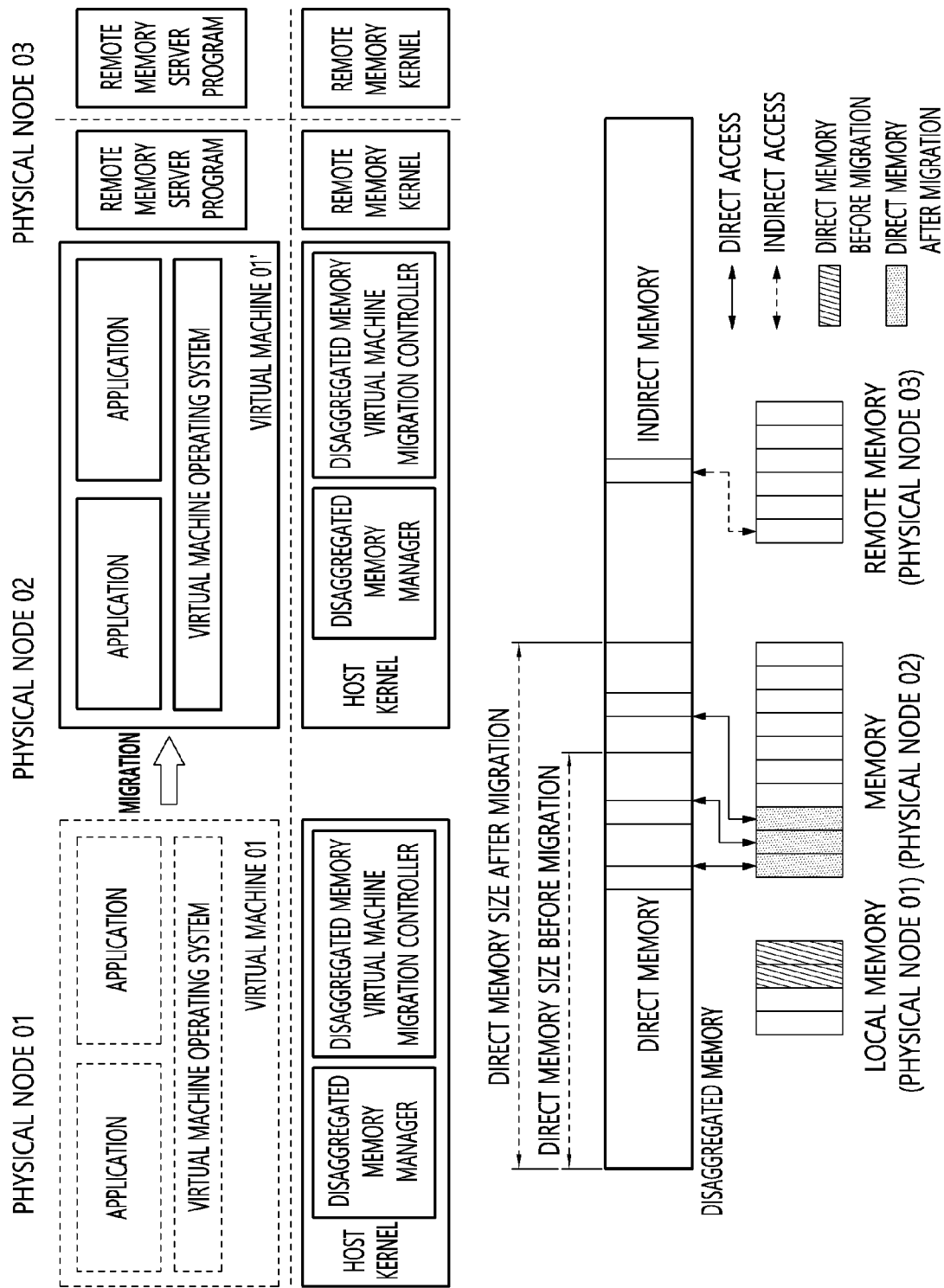
FIG. 4 is a diagram illustrating in detail a change in the size of direct memory depending on migration of a virtual machine.

FIG. 4 is a diagram illustrating in detail a change in the size of direct memory depending on migration of a virtual machine.

Referring to FIG. 4, virtual machine 01 running on physical node 01 is migrated to physical node 02 and is allocated more memories, so that the size of direct memory may be increased, and thus more performance-sensitive data may be located in the direct memory.

This scheme is controlled by a disaggregated memory virtual machine migration controller and is configured to consider the current remote memory access pattern and reduce the cost of an interconnect required for connection between nodes in such a way that a disaggregated memory manager additionally utilizes the analysis of a remote memory access pattern, the analysis of a Working Set Size (WSS) required through remote memory access, movement control for remote memory servers, and remote memory control for eviction occurring in migration of a virtual machine so as to perform remote memory access, thus realizing effective virtual machine migration.

Figure 5:
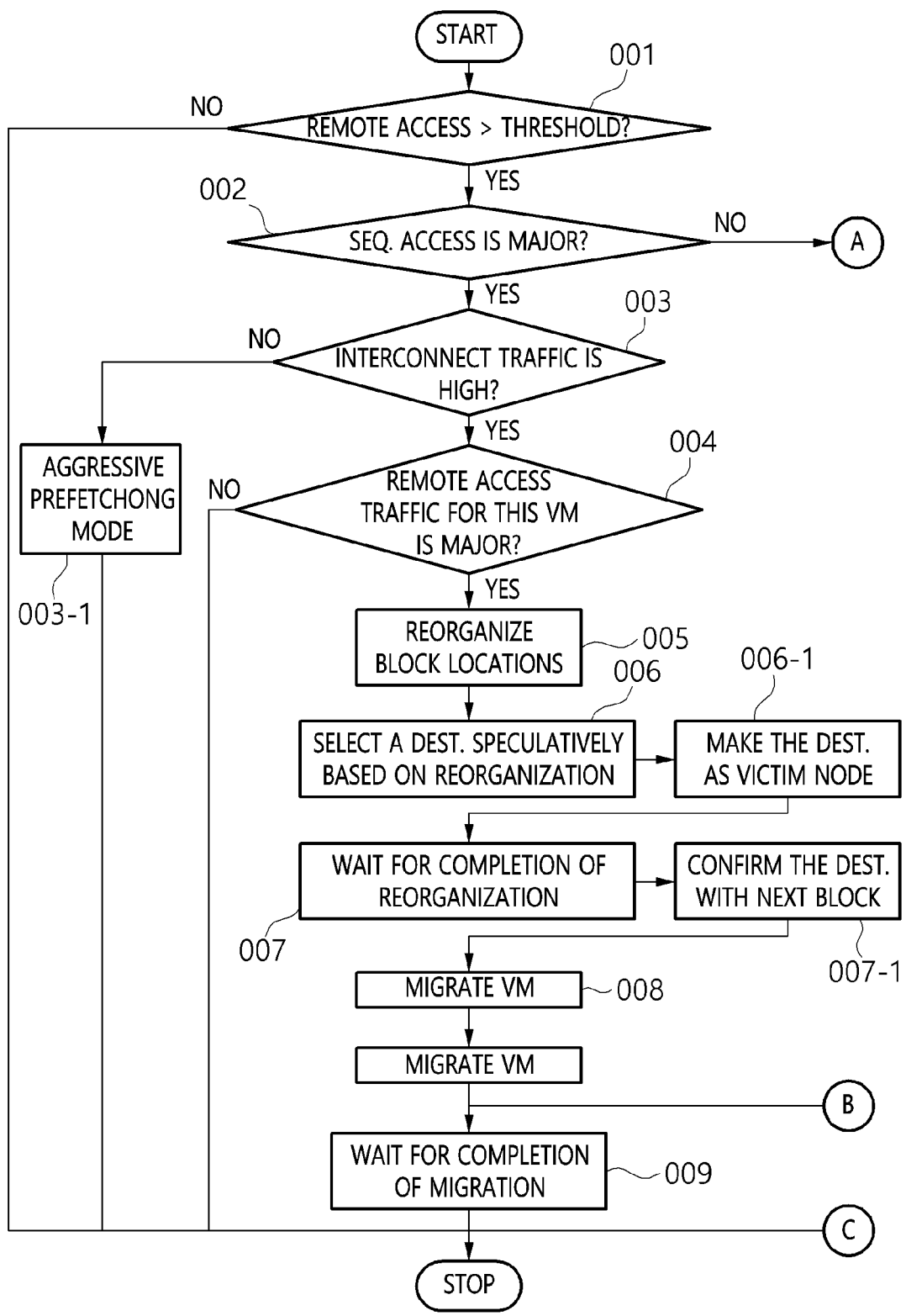
FIGS. 5 and 6 are flowcharts illustrating a method for migrating a virtual machine in a memory-disaggregated environment according to an embodiment of the present disclosure.
Figure 6:
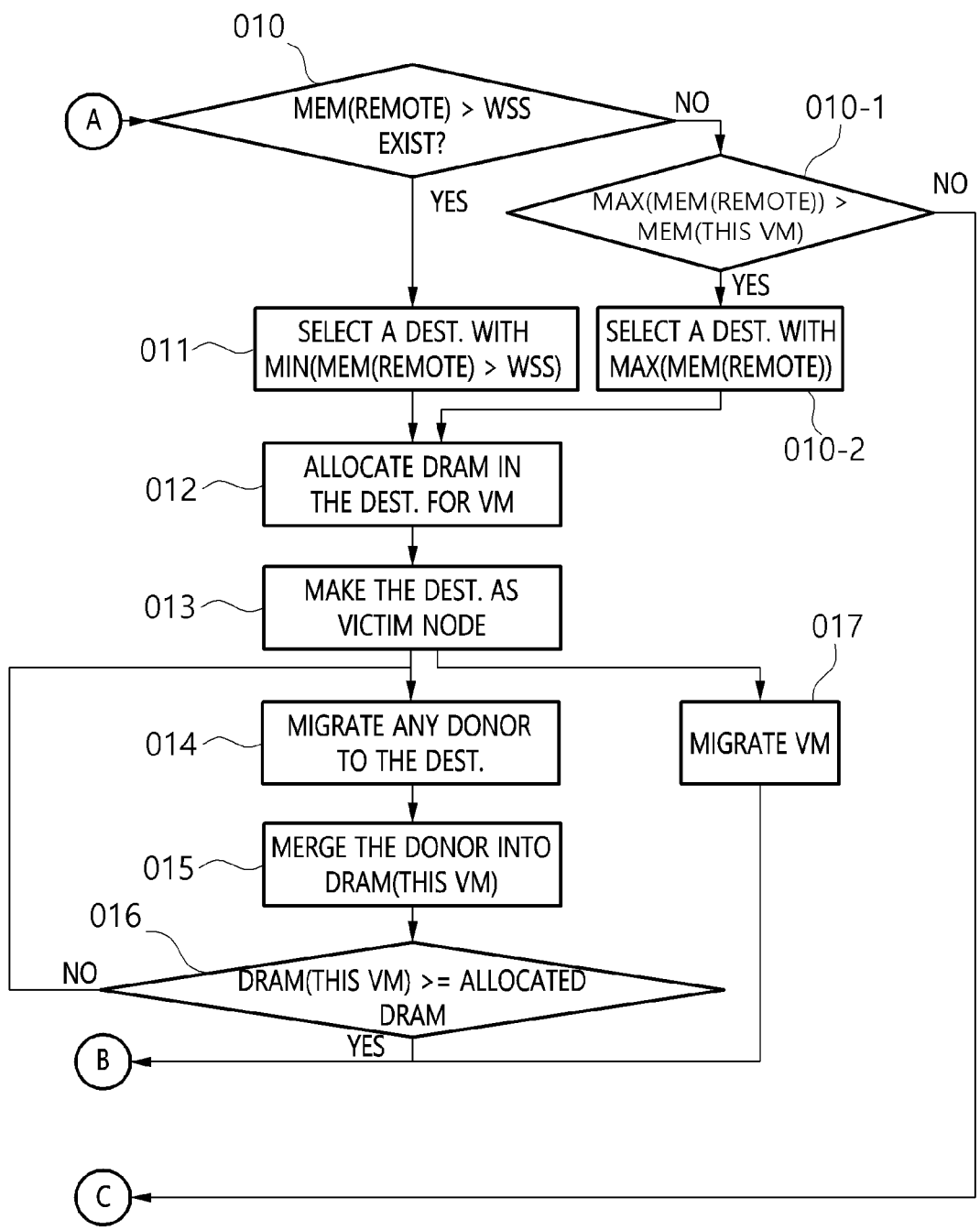

FIGS. 5 and 6 are flowcharts illustrating a method for migrating a virtual machine in a memory-disaggregated environment according to an embodiment of the present disclosure.

Referring to FIGS. 5 and 6, when remote memory access exceeds a threshold set by a user or manager, migration of a virtual machine is performed in consideration of performance at step 001. Here, the threshold may be set in various forms such as the number of accesses to remote memory, the size of remote memory, or network speed, and the scope of the present disclosure is not limited thereto.

Upon accessing to the remote memory, the physical address (Guest Physical Address: GPA) of the virtual machine for the corresponding memory may be known. Here, whether access to the remote memory is sequential may be determined using the physical address of the virtual machine at step 002.

When it is determined that remote memory access is sequential, it is determined whether a large amount of interconnect traffic used for remote memory access occurs at step 003. Here, a process of determining whether a large amount of interconnect traffic occurs at step 003 may correspond to a process of comparing the interconnect traffic with a preset threshold value. Further, the threshold value may be changed depending on manager settings or the like.

When virtual machines, located in the same physical node and using multiple disaggregated memories, incur a large number of remote memory accesses, a large amount of interconnect bandwidth is used in the corresponding node, thus influencing other virtual machines running on the corresponding node.

When there is less interconnect traffic (less than or equal to the preset threshold value), it is possible to respond to remote memory access through aggressive page prefetching rather than selecting migration of the virtual machine in order to respond to sequential memory access at step 003-1.

When there is large interconnect traffic, whether the current virtual machine is a migration target is determined by checking whether the current virtual machine generates a largest amount of traffic, among disaggregated memory virtual machines, present in the physical node, at step 004. When it is determined that the current virtual machine is not a migration target, it may be determined that another virtual machine is to be migrated, and the current virtual machine is not migrated.

When it is determined that the corresponding virtual machine is the migration target, reorganization of blocks present in an additional memory node in which the corresponding virtual machine is used is requested such that the blocks are optimized for sequential access at step 005.

Next, the time point at which reorganization is to be completed and a predicted memory node are speculatively selected as a migration destination node (DEST) using the progress rate of reorganization of a remote memory server at step 006.

The memory node predicted at step 006 is selected as the target of eviction (i.e., victim node), all evictions occurring from the current time are set to be transmitted to the migration destination node at step 006-1, and reorganization of blocks to be completed is waited for at step 007.

Next, whether the memory node predicted at step 006 is the node in which subsequent remote memory access occurs is determined, and migration progresses by selecting pre-migration, live-migration or like from among typical virtual machine migration techniques depending on the case where corresponding prediction is true and the case where the prediction is false at step 007-1.

Subsequently, the virtual machine is migrated to the migration destination node at step 008. Here, processing of storage, a network, or the like, other than memory, may be performed in the same manner as that used for typical virtual machine migration. When migration of the virtual machine is completed, the process is terminated at step 009.

If it is determined that remote memory access is not sequential, remote memory access is checked to estimate memory requirement (working set size: WSS) of the virtual machine, and whether a remote node on which memory having the corresponding capacity indicating the memory requirement (WSS) is available at step exists is checked at step 010. Further, the node present before migration occurs is designated not to allocate further local DRAM to the virtual machine currently being migrated.

When there is no node on which memory having the corresponding capacity is available, and the capacity of a node having the maximum available memory, among nodes which provide remote memory, is smaller than the capacity of local DRAM used by the current virtual machine, the virtual machine is not migrated, and the process is terminated at step 010-1.

When there is no node on which memory having the corresponding capacity is available, and the capacity of a node having the maximum available memory, among the nodes which provide remote memory, is larger than the capacity of local DRAM used by the current virtual machine, a node having the maximum available memory is selected as the migration destination node from among the nodes which provide the remote memory at step 010-2.

When a remote node on which memory having the corresponding capacity is available at step exists, a node having the minimum available memory capacity is selected as the migration destination node from among nodes having memory, the capacity of which is equal to or greater than the memory requirement (WSS) of the virtual machine, at step 011.

Local DRAM for the virtual machine to be run after being migrated is allocated in the selected migration destination node, and is set to be remotely accessible during migration of the virtual machine at step 012.

Next, the target of eviction occurring due to memory pressure during operation in the current node is set as the migration destination node selected at step 011, and all evictions occurring from the current time are set to be transmitted to the migration destination node (victim node) at step 013.

Next, one of memory donors of the virtual machine is randomly selected and is migrated to the migration destination node at step 014.

A memory area corresponding to the migrated memory donor is merged with the area of the local DRAM of the virtual machine allocated at step 012 at step 015.

Until the migrated virtual machine completely fills the capacity of the local DRAM allocated from the migration destination node, steps 014 and 015 are repeated at step 016.

Simultaneously with steps 014 and 015, the migration of the current virtual machine is performed while memories located in the local DRAM present in the node before being migrated are transmitted to the migration destination node at step 017. That is, migration of the virtual machine may be performed in parallel to steps 014 and 015.

Figure 7:
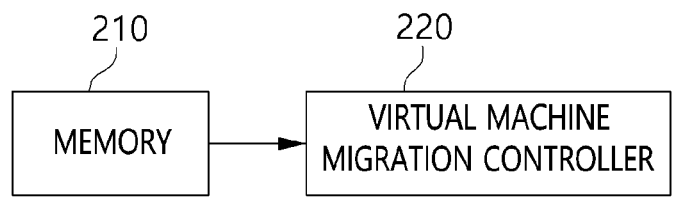
FIG. 7 is a block diagram illustrating an apparatus for migrating a virtual machine in a memory-disaggregated environment according to an embodiment of the present disclosure.

FIG. 7 is a block diagram illustrating an apparatus for migrating a virtual machine in a memory-disaggregated environment according to an embodiment of the present disclosure.

Referring to FIG. 7, the apparatus for migrating a virtual machine in a memory-disaggregated environment according to the embodiment of the present disclosure may include memory 210 for storing data, and a virtual machine migration controller 220 for determining whether to migrate the virtual machine based on the number of accesses to remote memory, establishing a migration policy for the virtual machine based on a remote memory access pattern, and determining a migration destination node based on the migration policy for the virtual machine. Here, the migration policy may include a first migration policy corresponding to the case where the remote memory access pattern is sequential and a second migration policy corresponding to the case where the remote memory access pattern is non-sequential.

Here, the virtual machine migration controller 220 may determine whether remote memory access is sequential using a guest physical address.

Here, the first migration policy is configured to perform aggressive prefetching from the remote memory when interconnect traffic occurring due to remote memory access is less than or equal to a threshold value.

Here, when the interconnect traffic of the virtual machine is greater than the threshold value, the first migration policy may be configured to determine whether to migrate the virtual machine by comparing the interconnect traffic of the virtual machine with the interconnect traffic of another virtual machine.

Here, the first migration policy may be configured to request reorganization so that disaggregated memory blocks used by the virtual machine are optimized for sequential access and to determine a memory node in which the blocks are reorganized to be a migration destination node.

Here, the second migration policy may be configured to determine whether to migrate the virtual machine and determine the migration destination node, based on the memory requirement (Working Set Size: WSS) of the virtual machine.

Here, the second migration policy may be configured to determine a memory node having the minimum available memory, among memory nodes satisfying the memory requirement, to be the migration destination node.

Here, when there is no memory node satisfying the memory requirement, the second migration policy may be configured to determine a memory node having the maximum available memory, among the memory nodes, to be the migration destination node.

Here, the virtual machine migration controller 220 may perform control such that data from remote memory used by the virtual machine is transmitted to the direct memory of the migration destination node.

Here, the virtual machine migration controller 220 may transmit data evicted from the node on which the virtual machine is running to the migration destination node.

Figure 8:
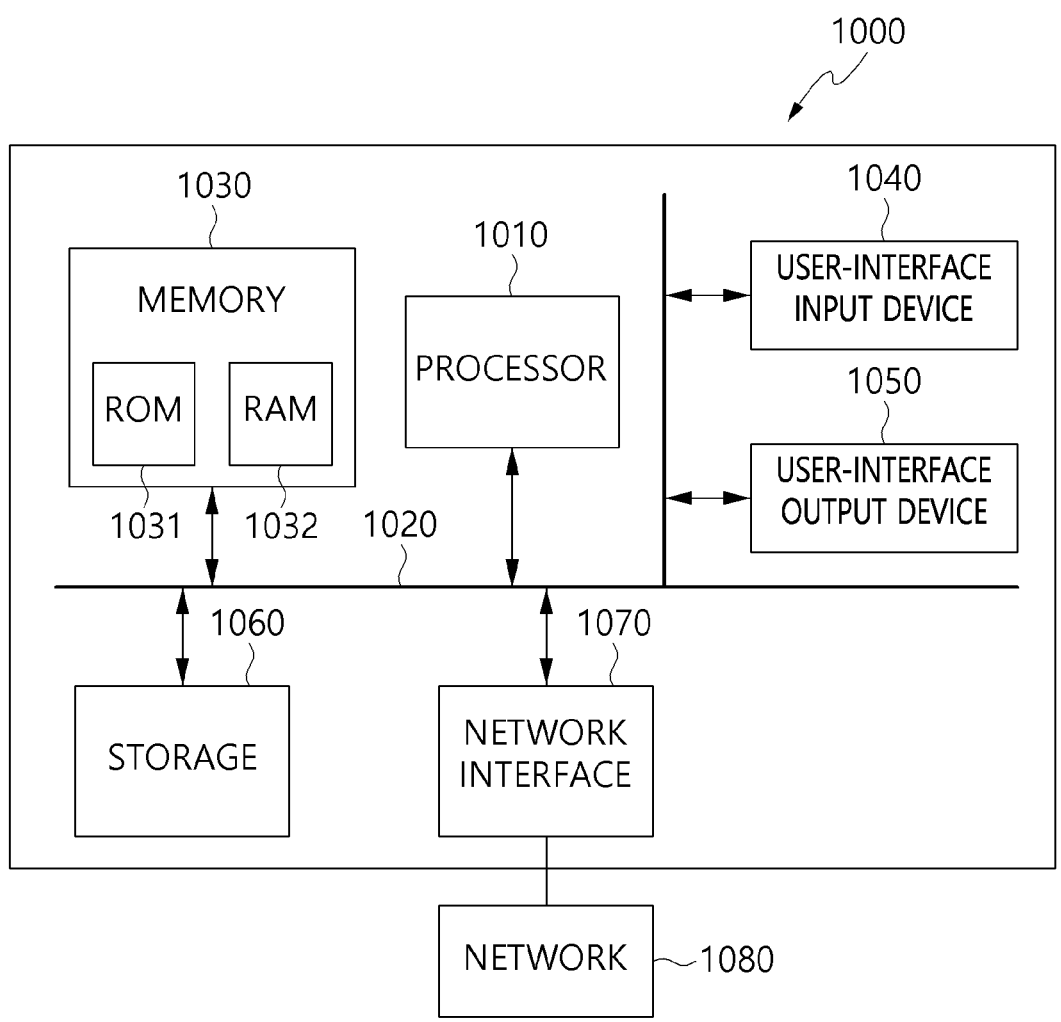
FIG. 8 is a diagram illustrating the configuration of a computer system according to an embodiment.

FIG. 8 is a diagram illustrating the configuration of a computer system according to an embodiment.

An apparatus for migrating a virtual machine in a memory-disaggregated environment according to an embodiment of the present disclosure may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium or a combination thereof. For example, the memory 1030 may include Read-Only Memory (ROM) 1031 or Random Access Memory (RAM) 1032.

Specific executions described in the present disclosure are embodiments, and the scope of the present disclosure is not limited to specific methods. For simplicity of the specification, descriptions of conventional electronic components, control systems, software, and other functional aspects of the systems may be omitted. As examples of connections of lines or connecting elements between the components illustrated in the drawings, functional connections and/or circuit connections are exemplified, and in actual devices, those connections may be replaced with other connections, or may be represented by additional functional connections, physical connections or circuit connections. Furthermore, unless definitely defined using the term "essential", "significantly" or the like, the corresponding component may not be an essential component required in order to apply the present disclosure.

According to the present disclosure, there can be provided an efficient method for dynamically migrating a virtual machine in a memory-disaggregated environment.

Further, the present disclosure may provide a method for efficiently performing migration of a virtual machine while maintaining the operation of the virtual machine.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A method for migrating a virtual machine in a memory-disaggregated environment, the method migrating a virtual machine running on a node in the memory-disaggregated environment, the method comprising:
determining whether to migrate a virtual machine based on a number of accesses to a remote memory;
establishing a migration policy for the virtual machine based on a remote memory access pattern; and
determining a migration destination node based on the migration policy,
wherein the migration policy includes:
a first migration policy corresponding to a case where the remote memory access pattern is sequential, and
a second migration policy corresponding to a case where the remote memory access pattern is non-sequential, wherein the first migration policy is configured to, when interconnect traffic occurring through remote memory access corresponds to a predetermined condition, perform aggressive prefetching from the remote memory.

2. The method of claim 1, wherein establishing the migration policy comprises:
determining whether the remote memory access pattern is sequential using a guest physical address.

3. The method of claim 1, wherein the first migration policy is configured to, when the interconnect traffic of the virtual machine is greater than the threshold value, determine whether to migrate the virtual machine by comparing the interconnect traffic of the virtual machine with interconnect traffic of an additional virtual machine.

4. The method of claim 3, wherein the first migration policy is configured to request reorganization of disaggregated memory blocks used by the virtual machine such that the disaggregated memory blocks are optimized for sequential access, and to determine a memory node in which the disaggregated memory blocks are reorganized to be the migration destination node.

5. The method of claim 1, wherein the second migration policy is configured to determine whether to migrate the virtual machine and determine the migration destination node, based on a memory requirement of the virtual machine.

6. The method of claim 5, wherein the second migration policy is configured to determine a memory node having a minimum available memory, among memory nodes satisfying the memory requirement, to be the migration destination node.

7. The method of claim 5, wherein the second migration policy is configured to, when there is no memory node satisfying the memory requirement, determine a node having a maximum available memory, among memory nodes, to be the migration destination node.

8. The method of claim 7, further comprising:
transmitting data from the remote memory used by the virtual machine to a direct memory of the migration destination node.

9. The method of claim 1, further comprising:
transmitting data evicted from a node on which the virtual machine is running to the migration destination node.

10. An apparatus for migrating a virtual machine in a memory-disaggregated environment, the apparatus comprising:
a memory device configured to store data; and
a virtual machine migration controller configured to determine whether to migrate a virtual machine based on a number of accesses to a remote memory, establish a migration policy for the virtual machine based on a remote memory access pattern, and determine a migration destination node based on the migration policy,
wherein the migration policy includes:
a first migration policy corresponding to a case where the remote memory access pattern is sequential, and
a second migration policy corresponding to a case where the remote memory access pattern is non-sequential, and
wherein the first migration policy is configured to, when interconnect traffic occurring through remote memory access corresponds to a predetermined condition, perform aggressive prefetching from the remote memory.

11. The apparatus of claim 10, wherein the virtual machine migration controller determines whether the remote memory access pattern is sequential using a guest physical address.

12. The apparatus of claim 10, wherein the first migration policy is configured to, when the interconnect traffic of the virtual machine is greater than the threshold value, determine whether to migrate the virtual machine by comparing the interconnect traffic of the virtual machine with interconnect traffic of an additional virtual machine.

13. The apparatus of claim 12, wherein the first migration policy is configured to request reorganization of disaggregated memory blocks used by the virtual machine such that the disaggregated memory blocks are optimized for sequential access, and to determine a memory node in which the disaggregated memory blocks are reorganized to be the migration destination node.

14. The apparatus of claim 10, wherein the second migration policy is configured to determine whether to migrate the virtual machine and determine the migration destination node, based on a memory requirement of the virtual machine.

15. The apparatus of claim 14, wherein the second migration policy is configured to determine a memory node having a minimum available memory, among memory nodes satisfying the memory requirement, to be the migration destination node.

16. The apparatus of claim 14, wherein the second migration policy is configured to, when there is no memory node satisfying the memory requirement, determine a node having a maximum available memory, among memory nodes, to be the migration destination node.

17. The apparatus of claim 16, wherein the virtual machine migration controller performs control such that data from the remote memory used by the virtual machine is transmitted to a direct memory of the migration destination node.

18. The apparatus of claim 10, wherein the virtual machine migration controller transmits data evicted from a node on which the virtual machine is running to the migration destination node.

* * * * *